June 26, 1962 L. F. W. DIJKEMA 3,041,147
APPARATUS FOR DETERMINING THE PURITY OF GASES
Filed April 12, 1960 4 Sheets-Sheet 1
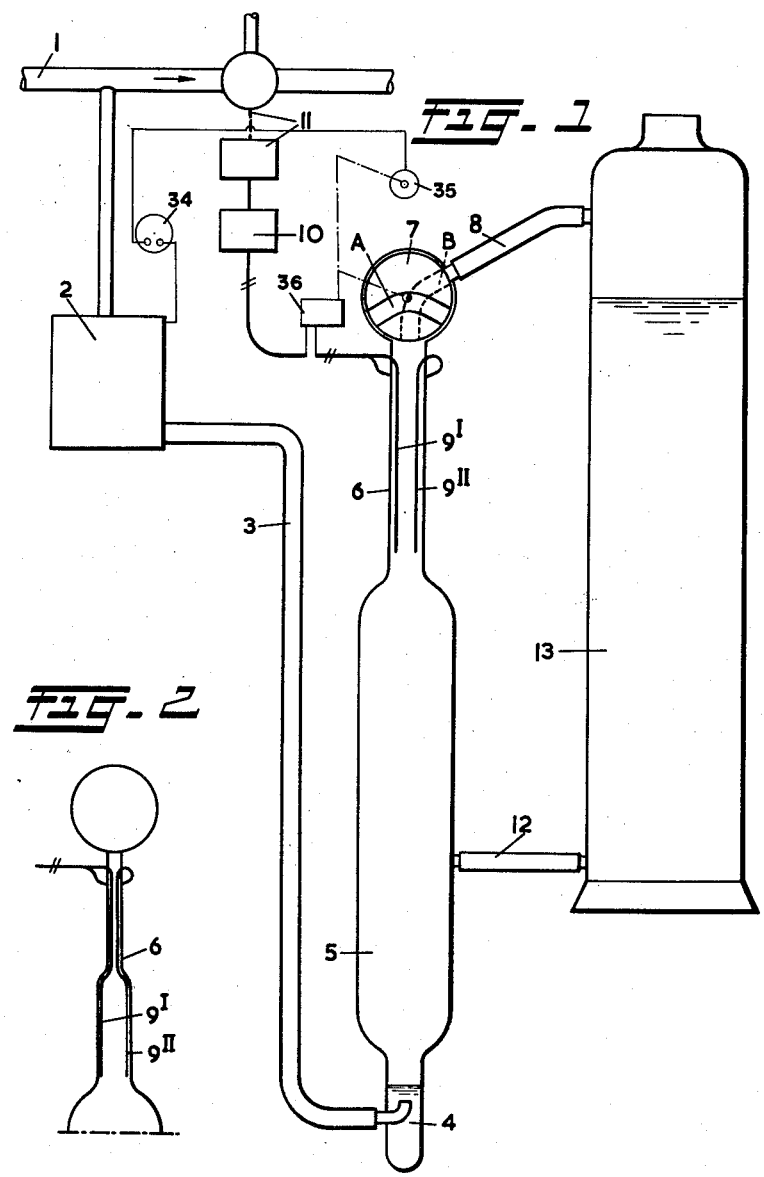

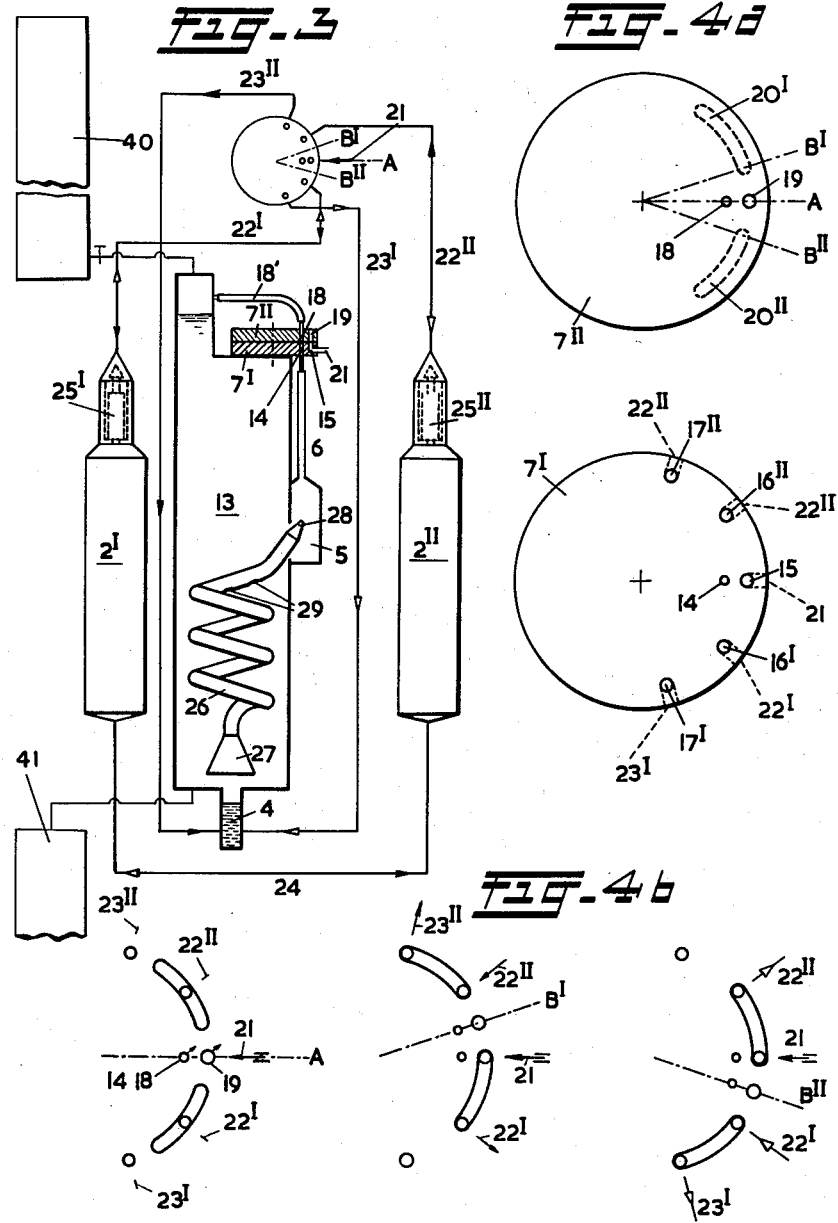

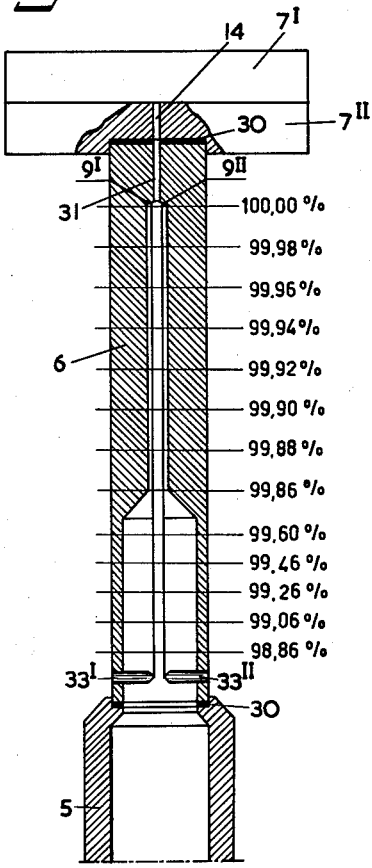

June 26, 1962 L. F. W. DIJKEMA 3,041,147
APPARATUS FOR DETERMINING THE PURITY OF GASES
Filed April 12, 1960 4 Sheets-Sheet 4
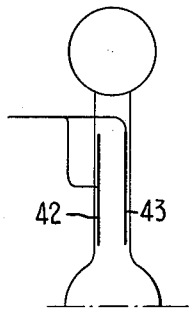
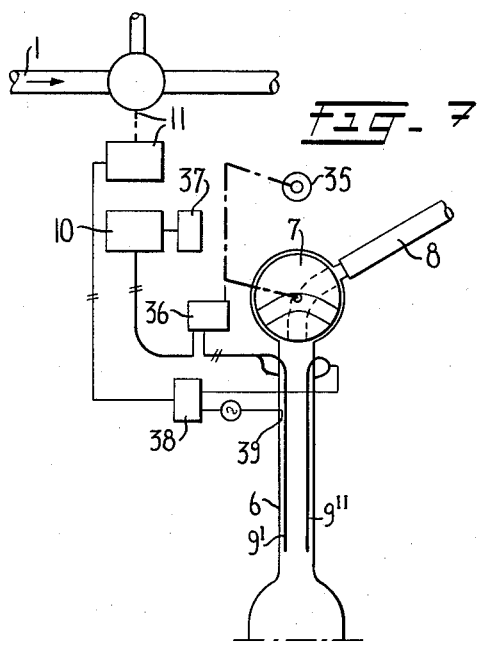
INVENTOR.
LEENDERT FREDERIK WILLEM
DIJKEMA
BY
ATTORNEY United States Patent Office 3,041,147
Patented June 26, 1962

3,041,147
APPARATUS FOR DETERMINING THE
PURITY OF GASES
Leendert Frederik Willem Dijkema, Rotterdam, Netherlands, assignor to Heineken's Brouwerijen Nederland N.V., Amsterdam, Netherlands, a limited-liability company of the Netherlands
Filed Apr. 12, 1960, Ser. No. 21,633
Claims priority, application Netherlands Apr. 15, 1959
17 Claims. (Cl. 23—256)

This invention relates to an apparatus for determining the purity of gases.

In those branches of industry where pure gases are either the main product or an important by-product it is of great importance to know when the gas formed has reached the desired degree of purity, i.e. when the content of contaminating gases has fallen below a predetermined value. As it is, the formed gas is often allowed to escape into the atmosphere before it has reached the desired degree of purity while when said purity is obtained the discharge conduit is transferred to a device in which the gas is further worked up. When said transfer takes place too late usable gas is lost, therefore. A device automatically effecting said transfer at the right moment will, therefore, be preferred over a device which requires human interference. Furthermore, such device must have the required accuracy of measurement.

There is a need for a device which is capable of determining degrees of impurity of the order of magnitude of 0.01% or less, which further renders an at least substantially continuous sampling possible without requiring specially skilled attendants and which is preferably capable of operating entirely automatically by its regulating e.g. a control device for the gas stream. In addition, such a device must preferably be of simple composition so as to be capable of operating as much as possible without interruptions.

The object of the invention is to provide an apparatus which entirely satisfies these requirements.

The invention will be illustrated with reference to the drawing showing an embodiment according to the invention; in this drawing:

FIG. 1 is a diagrammatic view of the entire apparatus according to the invention;

FIG. 2 is a modified form of a part of said apparatus;

FIG. 3 is a diagrammatic view of a specific embodiment of the apparatus according to the invention;

FIG. 4 shows a scheme of the various cock positions in the apparatus according to FIG. 3;

FIG. 5 shows an embodiment of the measuring tube proper;

FIG. 6 shows a modified form of a part of the apparatus in which only one resistance filament is used and a counter electrode; and FIG. 7 shows another modified form in which the apparatus responds to a specific threshold value for the gas purity.

The apparatus according to the invention is based on the principle that the gas whose purity is to be determined and which hereinafter will be called the "main gas" is absorbed in a liquid which does not or substantially does not dissolve the impurities and which hereinafter will be called the "absorbent." A gas sample of a certain volume is passed through such a liquid, whereupon the volume of the gas leaving the absorbent (impurity) is measured. If the sampling device and the measuring device proper are so equipped that always the same pressure ratios occur, which by means of manometric arrangements can be achieved in a simple manner, the degree of impurity of the main gas can immediately be deduced from the measured gas volume.

FIG. 1 diagrammatically shows a device for the examination of gas, with the help of which the invention will be elucidated. To a main conduit 1 through which the gas to be examined flows a sampling device 2 is connected. Said device may be of any nature provided that always an equal volume of gas is withdrawn from the conduit and is passed to the measuring device proper under constantly equal pressure conditions. Further it will generally be desirable that the sample taking is effected rapidly and at regular short intervals. Liquid displacing devices are excellently suitable for this purpose; they can in a simple manner be manometrically constructed in order to satisfy the pressure conditions. Examples of such devices will be discussed hereinafter.

The gas sample taken is pressed by the device 2 into a conduit 3 which ends in a mercury lock 4 at the bottom of an absorption vessel 5 of the measuring device proper. The liquid present in the vessel 5 only absorbs the main gas; in addition, said absorbent is either electrically conductive in itself or by the addition of an electrolyte. The absorption vessel is at the top narrowed to form a narrow riser tube 6; the cross section of said tube is either accurately the same throughout the entire length or it is accurately known. At the top the riser tube is closed by a cock 7 which in the position A, shown in solid lines, closes the riser tube 6 and in the position B, shown in broken lines, places the tube 6 into communication with a gas discharge tube 8 ending e.g. freely in the atmosphere.

In the riser tube 6 two filaments $9^I$ and $9^{II}$ are secured in parallel relationship with the tube wall. Said filaments consist of a metal or metal alloy of great electric resistance which is not affected by the absorbent used. Said filaments are at the top of the tube 6 passed through the tube wall and are further connected with a device 10 for measuring the electric resistance, e.g. a Wheatstone bridge. Said measuring device may further be connected with an electric measuring device or with a device 11 for regulating the gas stream. The devices 10 and 11 may be of any effective construction and consequently they are only shown in the form of a block diagram in the figure.

In the lower end of the absorption vessel a tube 12 is provided which communicates with a storage vessel 13 for the absorbent; according to the figure the tube 8 ends in the upper end of said vessel viz. above the liquid level. Instead of the storage vessel 13 a manometric riser tube may be used.

The operation of the device is as follows. The gas pressed into the conduit 3 by the sampling device 2 flows through the liquid present in the vessel 5 which binds the main gas. The cock 7 then is in the position A and the tube 6 is entirely filled with liquid. The unabsorbed impurity gases collect in the upper end of the tube so that the liquid is displaced and the resistance filaments partly become free above the liquid level. The displaced liquid (absorbent) flows into the storage vessel 13. Seeing that the resistance of the conductive liquid is very small compared to that of the filaments, the relation between the measured resistance and the volume of the impurity gas in the tube 6 will be known when the cross section of the tube 6 is accurately known.

Seeing that furthermore the sample taken has a fixed volume and is taken and passed on under uniform pressure conditions the degree of impurity of the sample can immediately be deduced from this volume. In this manner the degree of impurity is measured fully uninterruptedly. After the measuring has taken place the cock 7 is turned to position B so that the gas may escape; the displaced absorbent can then flow back and entirely fill the tube 6.

It is desirable to couple the cock 7 with the device 2 in such a manner that when the sample is taken the cock is in position B and when the sample is passed on to the measuring device the cock is in position A. This coordination is achieved with a time-switch 34, which controls simultaneously the device 2 and an electric motor 35. In one position of the switch 34 the motor 35 will turn the cock 7 to position A. After a certain time interval, the switch 34 takes another position, with the result that the motor 35 will turn the cock to position B. At the same time the device 2 is influenced so as to be passing on a sample or taking a sample. The motor 35 also actuates a micro-switch 36, switching on and off the measuring circuit 10. When the cock 7 is in position A, the measuring circuit 10 is switched on. If the measuring shows that the impurity content is low enough, the gas regulating device 11 is put into the position in which the main stream is led away to be further worked up. After one or more time intervals the measuring circuit is put in the position in which the main gas stream escapes to the atmosphere.

The degree of impurity can also be read directly by providing the tube 6, which as a rule is made from glass or other transparent material, with a scale. Further the tube 6 may consist of two parts as shown in FIG. 2, viz. an uppermost part of small and a lowermost part of larger cross section. In this manner in a specific range of small degrees of impurity the measuring can be effected very accurately, while in the range of higher impurity degrees where very small volumns are unimportant the relative measuring accuracy is all the same amply sufficient.

If no supply of fresh absorbent from the storage vessel 13 should take place the content of the binding substance in the absorbent would rapidly decrease in this relatively small space of the absorption vessel 5 due to the continuous binding of the main gas.

For this reason the gas is passed through the storage vessel, as will be described hereinafter, and if necessary fresh absorbent is continuously supplied to the storage vessel and at the same time an equal amount of spent absorbent is discharged during the measurements.

It is of importance that the filaments $9^I$ and $9^{II}$ lie at some distance from the wall of the tube 6 in order to prevent them from coming in the range of the liquid meniscus, which would lead to an incorrect measuring. Furthermore, filaments in the immediate vicinity of the wall might give rise to the formation of liquid films. In addition, the part which the liquid plays in the resistance of the electric circuit decreases when the filaments are placed more closely to each other. Also in the case of smaller contents, however, the conductive capacity of the absorbent is still very great with respect to that of the resistance filaments, and due to the smaller length and the relatively large cross section of the current path through the liquid the resistance contribution of the liquid with respect to that of the resistance filaments can always be neglected.

In order to prevent electrolysis of the absorbent or of the added electrolyte the measuring of the resistance should preferably be carried out with alternating current.

In this manner it has appeared to be possible to measure impurity degrees of 0.005%, which result cannot be achieved by any similar device.

In the embodiment shown the resistance filaments $9^I$ and $9^{II}$ run parallel to the wall of the tube. It will be clear that said filaments can also be provided along the tube wall in a different manner, e.g. in spiral or zig-zag fashion, provided that the relation between a change in resistance and a change in the liquid level be always fully known. It is also possible to use only one resistance filament 42, in which case a counter electrode 43 is immersed at a fixed point in the liquid (FIG. 6).

Though FIG. 1 in principle shows a control device 11 which is operated by the measuring circuit 11, such an "on and off" device may in those cases where a specific threshold value for the purity has been given be operated by a relay 38 which cooperates with a contact 39 which at the level corresponding with said threshold value has been provided in the tube 6, one of the filaments viz. $9^{II}$, and the contact 39 closing the relay circuit through the liquid (FIG. 7). In this case it is advisable to use a relay circuit with which a very slight current flows through said contact. The measuring circuit 10 is then used for the operation of a measuring device 37, e.g. an indicator instrument or a writing device.

FIG. 3 diagrammatically shows a practical embodiment of the apparatus according to the invention. In this embodiment the cock 7 also regulates the supply of gas to the sampling device 22 which in this case comprises two uniform displacers $2^I$ and $2^{II}$. The cock comprises two discs of which the lowermost $7^I$ is stationary and the uppermost $7^{II}$ is rotatable. In FIG. 4 a top view of the disc $7^I$ and a top view of the disc $7^{II}$ are shown, the gas conduits being schematically indicated with a few lines. The disc $7^I$ is provided with five bores ending in the top face and with a bore 14 which extends straight to the bottom face and ends there in the measuring tube 6 of the measuring device proper 5, which is substantially identical to the measuring device 5 according to FIGS. 1 and 2. The other bores 15, $16^I$, $16^{II}$, $17^I$ and $17^{II}$ end e.g. at the side and are there connected with gas conduits to be described hereinafter; the mouth centers of these last named bores in the top face of the disc $7^I$ are located on the same circle, whose radius is larger than the distance between the center of the circle and that of the opening 14. The disc $7^{II}$ is provided with two continuous bores 18 and 19 and with two uniform arcuate recesses $20^I$ and $20^{II}$; the bore 18 ends in the bottom face at the same central distance as the bore 14 and in the embodiment shown it is connected with a small tube 18' ending in the upper end of the vessel 13; the bore 19 and the recesses $20^I$ and $20^{II}$ are located on the same arc as the bores 15, 16 and 17 in the bottom face. The disc $7^{II}$ has three positions designated by A, $B^I$ and $B^{II}$. From FIG. 4B it appears that in position A the bore 14 corresponds with the bore 18 and the bore 15 with the bore 19; in the two other positions a bore 16, $16^I$ or $16^{II}$ always corresponds with a bore 17, $17^I$ or $17^{II}$, the bore 15 corresponding with the other bore 16.

A conduit 21 extends from the main conduit 1 (FIG. 1) from which a gas sample is to be taken and in which superatmospheric pressure prevails. When the cock 7 is in position A the gas sample may escape into the atmosphere through the bores 15 and 19. The measuring tube 6 communicates via the bore 18 at the top with the storage vessel 13, so that the tube 6 is entirely filled with the absorption liquid; as indicated in FIG. 3 said communication may be realized by means of a flexible tube which discharges at the top of the storage vessel 13; obviously, said communication may also be effected in another manner, e.g. via auxiliary bores in the bottom disc $7^I$. If now the cock is turned e.g. to position $B^I$ then the gas may flow through the bore 15, the recess $20^{II}$ and the bore $16^I$ into the conduit $22^I$. Said conduit discharges into the displacer $2^I$, which is entirely filled with a displacer liquid. Both displacers are provided with a floating valve $25^I$ and $25^{II}$ respectively which in their uppermost positions close the discharge openings of the conduits $22^I$ and $22^{II}$ respectively. The displacer liquid is forced aside by the gas and will via a conduit 24 which interconnects the lower ends of the two displacers flow into the displacer $2^{II}$, which until that moment had entirely been filled with gas; this will go on until the floating valve $25^{II}$ is forced upwards by the liquid, whereby the gas discharge conduit is closed. The gas from the displacer $2^{II}$ has been pressed into the conduit $22^{II}$ and flows through the bore $16^{II}$, the recess $20^I$ and the bore $17^{II}$ into a conduit $23^{II}$ ending in the mercury lock 4.

The cock is turned to position $B^{II}$ via position A.

In said last named position the unabsorbed gas may escape from the measuring tube and said tube is again entirely filled with the absorbent.

Meanwhile the gas flows from the conduit 21 into the atmosphere which makes it possible for successive samples to be taken from flow section in the main conduit 1 which are located too closely to each other. In position $B^{II}$ the same takes place as in position $B^I$, with the understanding that now the liquid from displacer $2^{II}$ is pressed into displacer $2^I$, the gas from the latter being forced to the measuring device.

Seeing that the displacers $2^I$ and $2^{II}$ are identical, samples of equal volumes will always be taken.

In the apparatus shown in FIG. 3 the mercury lock 4 is provided in the lower end of the storage vessel 13, the measuring device 5—6 being provided laterally of the latter. In order to feed the gas to the measuring device a helically wound tube 26 is provided, having a funnel shaped lower end 27 with which it ends above the mercury lock 4. The other end 28 of said tube discharges in the lower end of the liquid vessel 5 which also communicates directly with the storage vessel 13. The tube 26, therefore, is likewise entirely filled with absorbent; as a result the absorption path for the gas bubbles is appreciably lengthened. The gas bubbles will set the absorption liquid in the tube 26 in motion, it being possible for said liquid to flow back into the vessel 13 through the apertures 29 provided adjacent the end 28 at the lower end of the tube 26. In this way the absorbent in the tube will continuously be renewed.

The two displacers which are arranged symmetrically may be replaced by one single displacer comprising two chambers and which in the manner indicated in FIG. 1 is incorporated in the system. The sampling chamber proper can then be identical with one of the displacers according to FIG. 3, but at the lower end it communicates with an auxiliary chamber into which the liquid is forced when the top of the first named chamber is connected with the gas conduit. By turning a cock the gas pressure is transferred to the auxiliary chamber and at the same time the top of the sampling chamber is transferred to the conduit 3 so that the gas in the sampling chamber is forced to the measuring device proper. The double construction according to FIG. 3, however, admits of a higher sample taking frequency.

FIG. 5 further shows a practical embodiment of the measuring tube in section and substantially in full size. Both the measuring tube 6 and the liquid tube 5 are made from a transparent insulating material, preferably an unbreakable material which is easy to work, such as perspex. The tubes 5 and 6 are coupled to each other by means of a packing ring 30, made e.g. from polyvinyl chloride (PVC). In the case of a specific embodiment the bore diameter of the narrow part is 4 mm. At the top a portion 31 of a smaller diameter, in the present instance 1 mm. links up with said part and on the boundary of the two parts the filaments $9^I$ and $9^{II}$ project through the wall and thence extend parallel through the tube. By capillary action the part 31 will always remain filled with liquid, except when the tube is flushed, so that the unabsorbed gas cannot penetrate therein. In this manner a fixed zero line is provided from which the length of the gas bubble is measured, because here also the resistance filaments commence. Seeing that the cock 7 is preferably made from non-rusting material the insulation difficulties which would present themselves if it should be possible for the gas to rise as far as the cock are avoided in this way, for otherwise the filaments would have to extend so far. Between the cock 7 and the tube 6 a packing ring 30 is provided, made e.g. from PVC. The resistance filaments which consisted of V4A steel having a diameter of 0.1 mm. and a resistance of 68 Ω/m. are at their other ends held by insulating stifts $33^I$ and $33^{II}$ respectively, which are made e.g. from perspex and which extend through the wall of the tube 6. FIG. 5 further shows a scale by means of which the purity of the main gas can be directly read; the figure clearly shows that a reading accuracy of 0.01% can easily be achieved.

It will be clear that the apparatus described can be used for determining the purity of all the gases which are readily soluble in a liquid or which readily admit of being chemically bound, provided that the impurities are not retained therein.

In the subjoined table a survey is given of such gases and the appropriate absorbing liquids:

| Gas | Absorbing liquid |
|---|---|
| Acid gases (e.g. $CO_2$) | Concentrated KOH. |
| $O_2$ | Alkaline $Na_2S_2O_4$ (dithionite). |
| CO | Alkaline CuCl. |
| CO | Alkaline $PdCl_2$ (produces an equal amount of $CO_2$ which is absorbed in alkali). |
| Basic gases (e.g. $NH_3$) | $H_2SO_4$, $H_3PO_4$. |
| $CH_4$ | Oxidizing solution producing an equal amount of $CO_2$. |

In most cases it will be the air content that is to be determined, but it is also possible to carry out an examination as to the presence of other gases. It may then be desirable first to remove a certain constituent from the gas to be examined or to make two or more of the apparatuses described operate in parallel with different absorption agents in order to be able to determine simultaneously an amount of two or more impurities.

The absorption agent should be conductive; if it is not it will have to be made conductive by the addition of a salt or another electrolyte. In general the concentration of the absorption agent and/or the electrolyte should be high in order to make the solubility of the remaining gases as small as possible, because otherwise the high degree of measuring accuracy which is achievable will not be achieved. If said solubility is small the absorbent will be saturated after a number of sample takings or after a pre-treatment, so that in that case the remaining gases will be allowed to pass. In that case a thermostatic arrangement may be useful, but in actual practice it has not been found necessary.

As a rule glycerine is used as a displacer liquid. However, glycerine may contain water, which is unallowable if the gas to be examined is strongly water soluble (e.g. $NH_3$); in that case preferably a mineral oil, e.g. paraffin oil is used.

It is advisable in the case of continuous measurements, particularly if a poorly stable absorbent is used to continuously supply fresh absorption liquid from a supply apparatus 40 (FIG. 3) into the apparatus and at the same time to discharge (spent) absorption liquid to a waste vessel 41, the supply of fresh absorbent about compensating for the use of the absorption agent during the measurements.

If the conductive capacity of the absorbent is slightly variable during the measurements then small deviations may be eliminated by placing in the absorbent the same resistance filaments as in the measuring tube and by incorporating these with those of the measuring tube in a Wheatstone bridge, whereupon the degree of impurity can be deduced from the difference in current strength.

I claim:

1. Apparatus for determining the purity of gases, comprising a device for taking a gas sample and for supplying said gas sample to a discharge conduit, a vessel adapted to be filled with a solution which is effective to absorb the main gas but does not absorb the impurities, said discharge conduit ending in the lower end of said vessel and said vessel at its top merging into a narrow riser tube in which the solution may rise, a storage vessel for said solution communicating with the first named vessel for flow of said solution thereto, a cock mounted on the upper end of said riser tube, said cock being movable into a position to close the riser tube and into a position to open it and place it into communication with the atmosphere, a resistance element disposed in the riser tube, said element extending over about the entire length of said tube, a device for measuring resistance, and a conduit in the upper end of said tube passing through the wall of the tube and connected with said device for measuring the resistance.

2. Apparatus as claimed in claim 1, wherein the resistance element comprises two resistance filaments which are provided in the riser tube in such manner that a change in the liquid level in said tube will effect a change in resistance which according to a known function depends on the change in level.

3. Apparatus as claimed in claim 1, wherein the resistance element comprises a single resistance filament and a fixed electrode permanently immersed in the solution, the resistance filament being so provided in the riser tube that a change in the liquid level in said tube will effect a change in resistance which according to a known function depends on the change in level.

4. Apparatus as claimed in claim 1, wherein the cock on the riser tube is so coupled with the sample taking device that when a sample is taken said cock is in open position and when said sample is supplied to the measuring device the cock is in closed position.

5. Apparatus as claimed in claim 4, wherein the cock is coupled with a driving element which at intervals brings about a movement of the cock from one of said positions to the other of said positions.

6. Apparatus as claimed in claim 1, wherein the riser tube is provided with a scale.

7. Apparatus as claimed in claim 1, wherein the riser tube has a wider lowermost part and a narrower uppermost part.

8. Apparatus as claimed in claim 1, wherein the discharge conduit of the sample taking device ends in a mercury lock disposed in the lower end of the first-named vessel.

9. Apparatus according to claim 1, wherein the resistance element is connected with a control device including a control circuit, a driving means and a three-way cock for leading the main gas stream in one of two directions, the control device switching on the driving means when the actual resistance of the resistance element reaches a certain value, the driving means moving the said three-way cock to one of its two positions in dependence on the resistance value.

10. Apparatus as claimed in claim 1, wherein there is disposed above the mouth of the discharge conduit of the sample taking device a helically wound tube into which the absorption liquid may freely enter and which has a funnel-shaped lower end discharging directly above the mouth of the discharge conduit, the other end of said tube ending adjacent the riser tube.

11. Apparatus as claimed in claim 10, wherein adjacent the upper end downwardly directed outflow openings for the absorption liquid are provided in the wall of the tube.

12. Apparatus as claimed in claim 10, wherein the mouth of the discharge conduit of the sample taking device is provided in the lower end of the storage vessel and the funnel shaped end of the tube is placed above said mouth, the tube extending for the greater part through said storage vessel and the riser tube vessel freely communicating with said storage vessel.

13. Apparatus as claimed in claim 1, wherein the sample taking device comprises two uniform chambers which are interconnected at their lower ends and are adapted to be filled with a displacer liquid, and a second cock, a floating valve disposed in each chamber, said valve in its uppermost position being adapted to float on the liquid and close a gas conduit ending in the upper part of the appurtenant chamber, said second cock being connected to the gas supply conduit from which a sample is to be taken and to the gas discharge conduit, and said second cock being movable into a first position and into a second position, in said first position of said second cock the gas conduit of one chamber communicating with the gas conduit from which a sample is to be taken and the gas conduit of the other chamber communicating with the gas discharge conduit and in said second position of said second cock reverse connections are made.

14. Apparatus as claimed in claim 4 wherein the second cock has a third position which said cock passes when moved from the first to the second position, in which third position the gas supply conduit is connected to the atmosphere whereby in between the sample takings the gas may freely escape from the space from which the sample is taken.

15. Apparatus according to claim 13, wherein the cock of the sampling device and that of the riser tube form part of a composite cock, the arrangement being such that the riser tube is closed when a gas sample is displaced in the discharge conduit and is opened when the sampling device is reversed, in the last position the gas supply conduit being in communication with the atmosphere.

16. Apparatus according to claim 1, wherein the storage vessel is incorporated in a liquid conduit system in which the absorption liquid is continuously renewed and circulated.

17. Apparatus according to claim 1 for use in those cases in which a threshold value of the gas purity has been given, wherein there is provided in the riser tube a fixed contact at a level corresponding with said threshold value and said contact is connected with an electric switch which when the threshold value is reached actuates an external electric circuit.

References Cited in the file of this patent

UNITED STATES PATENTS

| | | |
|---|---|---|
| 895,798 | Schatz | Aug. 11, 1908 |

FOREIGN PATENTS

| | | |
|---|---|---|
| 350,584 | Great Britain | June 18, 1931 |